US012580213B2

(12) United States Patent
Inoue et al.

(10) Patent No.: US 12,580,213 B2
(45) Date of Patent: Mar. 17, 2026

(54) FUEL CELL SYSTEM

(71) Applicant: HONDA MOTOR CO., LTD., Tokyo (JP)

(72) Inventors: Tomoyuki Inoue, Wako (JP); Ryoji Sakai, Wako (JP); Yuto Nakatani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 484 days.

(21) Appl. No.: 18/124,643

(22) Filed: Mar. 22, 2023

(65) Prior Publication Data

US 2023/0317993 A1    Oct. 5, 2023

(30) Foreign Application Priority Data

Mar. 29, 2022    (JP) ................................. 2022-053495

(51) Int. Cl.
| | |
|---|---|
| *H01M 8/04858* | (2016.01) |
| *H01M 8/04302* | (2016.01) |
| *H01M 8/0432* | (2016.01) |
| *H01M 8/0438* | (2016.01) |
| *H01M 8/04537* | (2016.01) |

(52) U.S. Cl.
CPC ... *H01M 8/04947* (2013.01); *H01M 8/04302* (2016.02); *H01M 8/04335* (2013.01); *H01M 8/0438* (2013.01); *H01M 8/04626* (2013.01)

(58) Field of Classification Search
CPC ......... H01M 8/04947; H01M 8/04302; H01M 8/04335; H01M 8/0438; H01M 8/04626; H01M 8/04225; H01M 8/04694; Y02E 60/50

USPC ........................................................ 429/400
See application file for complete search history.

(56) References Cited

U.S. PATENT DOCUMENTS

| | | | |
|---|---|---|---|
| 2009/0130497 A1 | 5/2009 | Oishi et al. | |
| 2010/0021778 A1* | 1/2010 | Steinshnider ..... | H01M 8/04164 |
| | | | 429/410 |
| 2017/0352902 A1 | 12/2017 | Ojima | |

(Continued)

FOREIGN PATENT DOCUMENTS

| | | |
|---|---|---|
| JP | 2003-168464 A | 6/2003 |
| JP | 2004-055379 A | 2/2004 |

(Continued)

OTHER PUBLICATIONS

Office Action dated Jan. 30, 2024 issued in the corresponding Japanese Patent Application No. 2022-053495 with the English machine translation thereof.

*Primary Examiner* — Christian Roldan

(74) *Attorney, Agent, or Firm* — Carrier, Shende & Associates P.C.; Joseph P. Carrier; Fulchand P. Shende

(57) ABSTRACT

During startup of a fuel cell system, feed forward control is performed to increase the rotation number of an electric auxiliary device (compressor) to a modified steady state rotation number while maintaining a steady state rotation acceleration rate of the electric auxiliary device. In this manner, the overshoot amount is suppressed to an allowable overshoot amount. Otherwise, feed forward control is performed to increase the rotation number of the electric auxiliary device to a modified low steady state rotation number while maintaining a low steady state rotation acceleration rate. In this manner, the overshoot amount is suppressed to an allowable overshoot amount.

7 Claims, 5 Drawing Sheets

(56)  References Cited

U.S. PATENT DOCUMENTS

| | | | | |
|---|---|---|---|---|
| 2018/0226666 A1* | 8/2018 | Kaneko | ............. | H01M 8/04111 |
| 2019/0288307 A1* | 9/2019 | Kim | ........................ | B60L 58/12 |
| 2020/0127310 A1* | 4/2020 | Watanabe | ........... | H01M 10/486 |
| 2021/0075041 A1* | 3/2021 | Irie | ................... | H01M 8/04328 |
| 2021/0104758 A1* | 4/2021 | Tanimoto | .......... | H01M 8/04567 |
| 2021/0391588 A1* | 12/2021 | Won | ................. | H01M 8/04417 |

FOREIGN PATENT DOCUMENTS

| | | | |
|---|---|---|---|
| JP | 2006-147490 A | 6/2006 |
| JP | 2006-278153 A | 10/2006 |
| JP | 2009-238457 A | 10/2009 |
| JP | 2017-220296 A | 12/2017 |
| JP | 2018-106909 A | 7/2018 |
| JP | 2021-190235 A | 12/2021 |
| WO | 2006/077970 A1 | 7/2006 |

* cited by examiner

FIG. 2

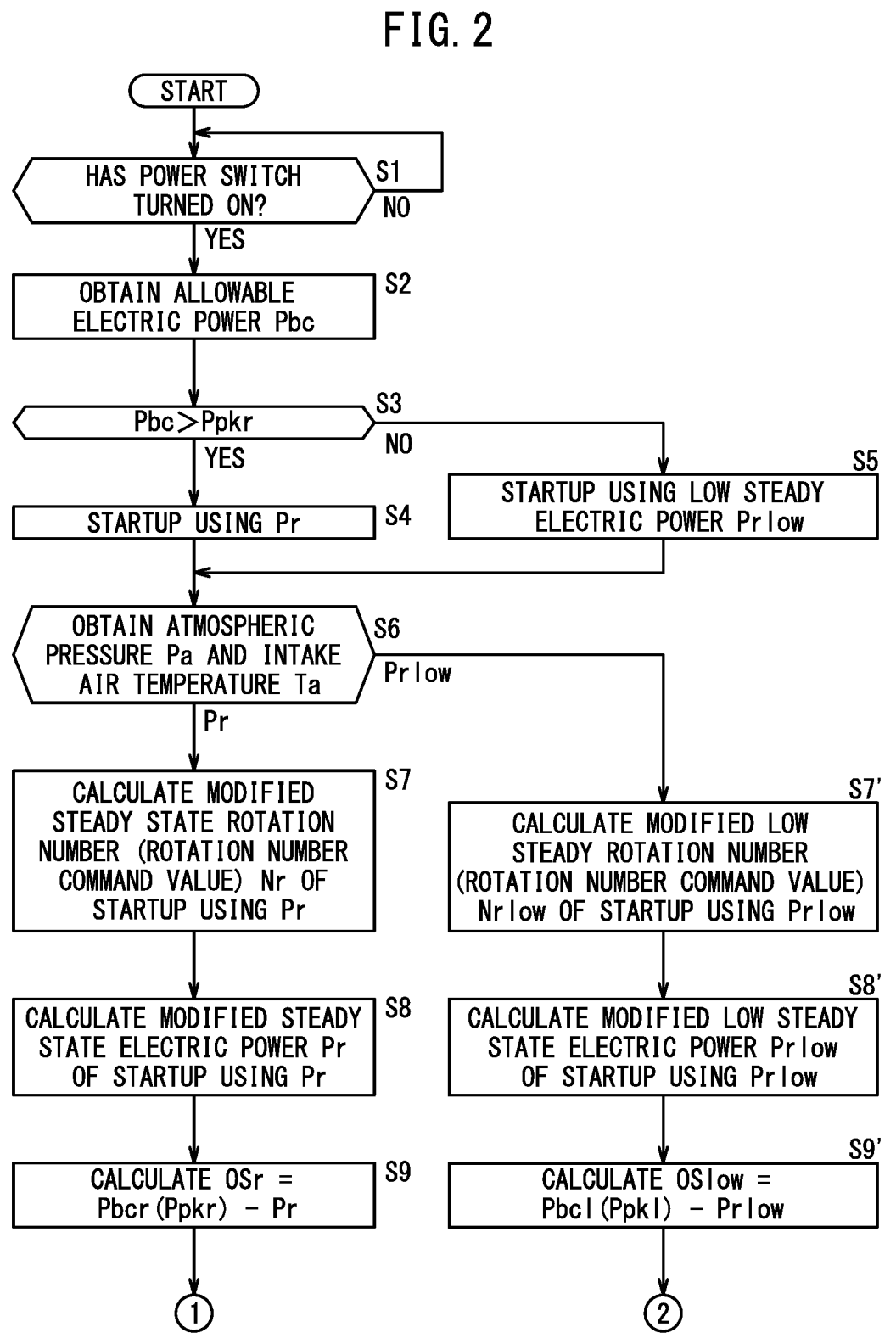

START

S1   HAS POWER SWITCH TURNED ON?   NO

YES

S2   OBTAIN ALLOWABLE ELECTRIC POWER Pbc

S3   $Pbc > Ppkr$   NO

YES

S5   STARTUP USING LOW STEADY ELECTRIC POWER Prlow

S4   STARTUP USING Pr

S6   OBTAIN ATMOSPHERIC PRESSURE Pa AND INTAKE AIR TEMPERATURE Ta   Prlow

Pr

S7   CALCULATE MODIFIED STEADY STATE ROTATION NUMBER (ROTATION NUMBER COMMAND VALUE) Nr OF STARTUP USING Pr

S7'   CALCULATE MODIFIED LOW STEADY ROTATION NUMBER (ROTATION NUMBER COMMAND VALUE) Nrlow OF STARTUP USING Prlow S8   CALCULATE MODIFIED STEADY STATE ELECTRIC POWER Pr OF STARTUP USING Pr S8'   CALCULATE MODIFIED LOW STEADY STATE ELECTRIC POWER Prlow OF STARTUP USING Prlow S9   CALCULATE OSr = Pbcr(Ppkr) − Pr S9'   CALCULATE OSlow = Pbcl(Ppkl) − Prlow

Figure 3:
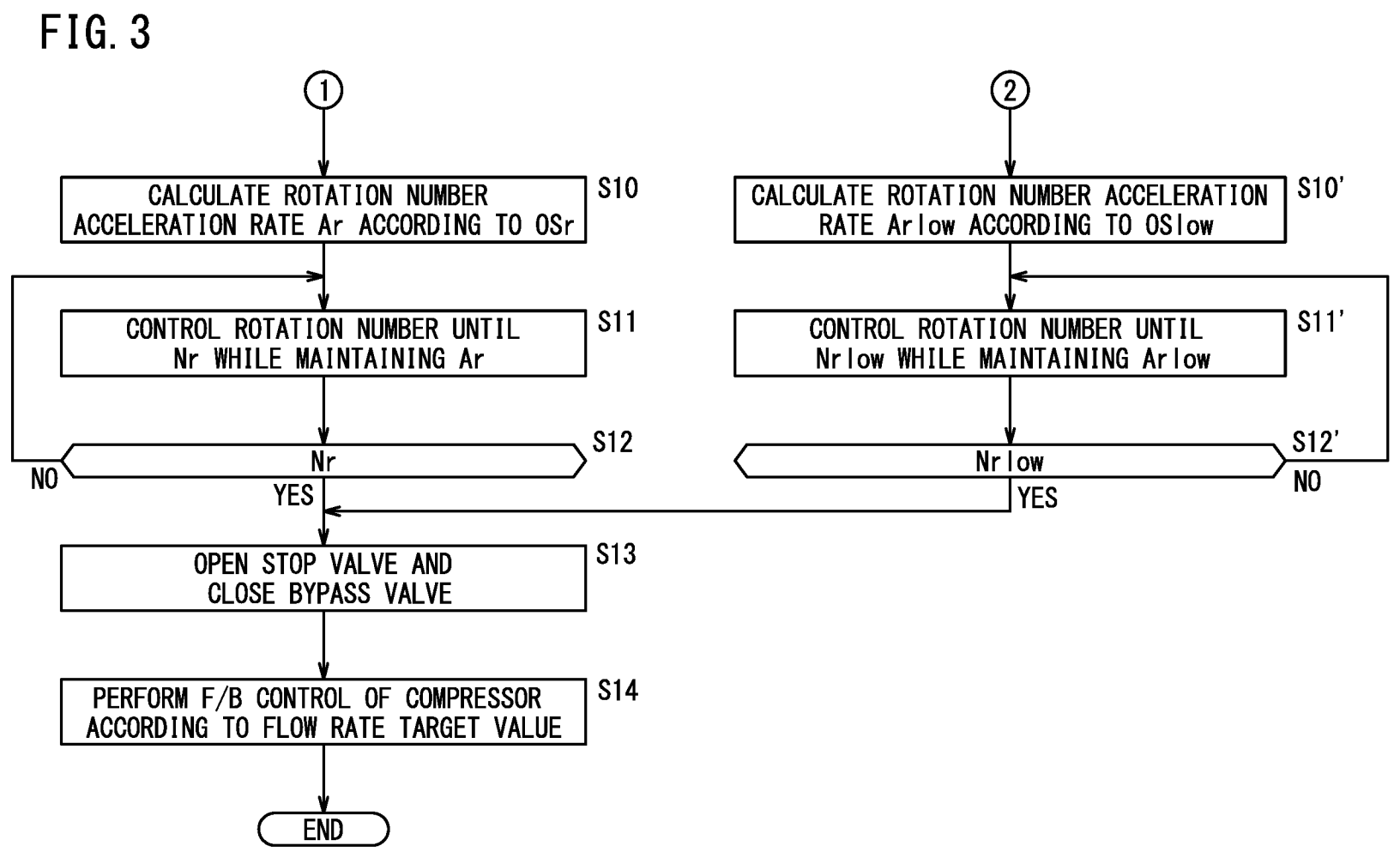

S10
CALCULATE ROTATION NUMBER ACCELERATION RATE Ar ACCORDING TO OSr

S11
CONTROL ROTATION NUMBER UNTIL Nr WHILE MAINTAINING Ar

S12
Nr
NO
YES

S13
OPEN STOP VALVE AND CLOSE BYPASS VALVE

S14
PERFORM F/B CONTROL OF COMPRESSOR ACCORDING TO FLOW RATE TARGET VALUE

END

②

S10'
CALCULATE ROTATION NUMBER ACCELERATION RATE Arlow ACCORDING TO OSlow

S11'
CONTROL ROTATION NUMBER UNTIL Nrlow WHILE MAINTAINING Arlow

S12'
Nrlow
NO
YES

FIG. 5

FUEL CELL SYSTEM

CROSS-REFERENCE TO RELATED APPLICATIONS

This application is based upon and claims the benefit of priority from Japanese Patent Application No. 2022-053495 filed on Mar. 29, 2022, the contents of which are incorporated herein by reference.

BACKGROUND OF THE INVENTION

Field of the Invention

The present invention relates to a fuel cell system for generating electricity by electrochemical reactions of a fuel gas and an oxygen-containing gas. In particular, the present invention relates to a fuel cell system capable of suitably controlling an electric auxiliary device during startup operation of the fuel cell system.

Description of the Related Art

In recent years, research and development have been conducted on fuel cells (FCs) that contribute to energy efficiency in order to ensure that more people have access to affordable, reliable, sustainable and modern energy.

For example, FIGS. 3(a) and 3(b) of JP 2003-168464 A discloses a technique of setting a low rotation number acceleration rate with a view to avoid the occurrence of peak power (inrush power) during startup of a compressor which supplies an oxygen-containing gas to a fuel cell.

SUMMARY OF THE INVENTION

In the conventional technique of setting a low rotation number acceleration rate during startup of the compressor, the startup time of the compressor becomes long undesirably.

An object of the present invention is to solve the above problem.

According to an aspect of the present invention, a fuel cell system is provided. The fuel cell system includes a fuel cell stack configured to perform power generation using a fuel gas and an oxygen-containing gas, an electric auxiliary device used for power generation operation of the fuel cell stack, an energy storage device configured to supply electric power to the electric auxiliary device, and a control device configured to control operation of the electric auxiliary device. The control device is configured to, at the time of driving the electric auxiliary device by feed forward control during startup, determine whether allowable discharge electric power of the energy storage device is not less than or less than peak electric power generated using a target setting of a steady state electric power of the electric auxiliary device. If the allowable discharge electric power of the energy storage device is not less than the peak electric power, the control device is configured to drive the electric auxiliary device using the target setting of the steady state operation rate to reach the steady state electric power, and if the allowable discharge electric power of the energy storage device is less than the peak electric power, the control device is configured to drive the electric auxiliary device using the target setting of a low steady state operation rate to reach low steady state electric power where the steady state electric power of the electric auxiliary device is decreased, so as to decrease the peak electric power to an allowable peak electric power which is less than the allowable discharge electric power.

In the present invention, during the startup of the fuel cell system, if it is determined that the peak electric power of the electric auxiliary device driven by feed forward control is not less than the allowable discharge electric power of the energy storage device, the control device drives the electric auxiliary device by the feed forward control using the target setting of the low steady state electric power where the steady state electric power of the electric auxiliary device is decreased and the target setting of the low steady state operation rate where the steady state operation rate is decreased. Therefore, it is possible to decrease peak electric power of the electric auxiliary device generated during the startup to be less than the allowable discharge electric power.

In this manner, it is possible to avoid excessive electric discharge (overload) of the energy storage device and prevent the startup time of the electric auxiliary device from becoming unnecessarily long, and shorten the startup time of the fuel cell system. Consequently, the technique contributes to energy efficiency.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2 is a flow chart used for explaining operation of the fuel cell system, during startup of the fuel cell system (1/2);

FIG. 3 is a flow chart used for explaining operation of the fuel cell system, during startup of the fuel cell system (2/2);

FIG. 5 is a map for calculating a rotation number acceleration rate of the compressor recorded in a memory unit of a control device.

DETAILED DESCRIPTION OF THE INVENTION

Embodiments

[Structure]

Figure 1:
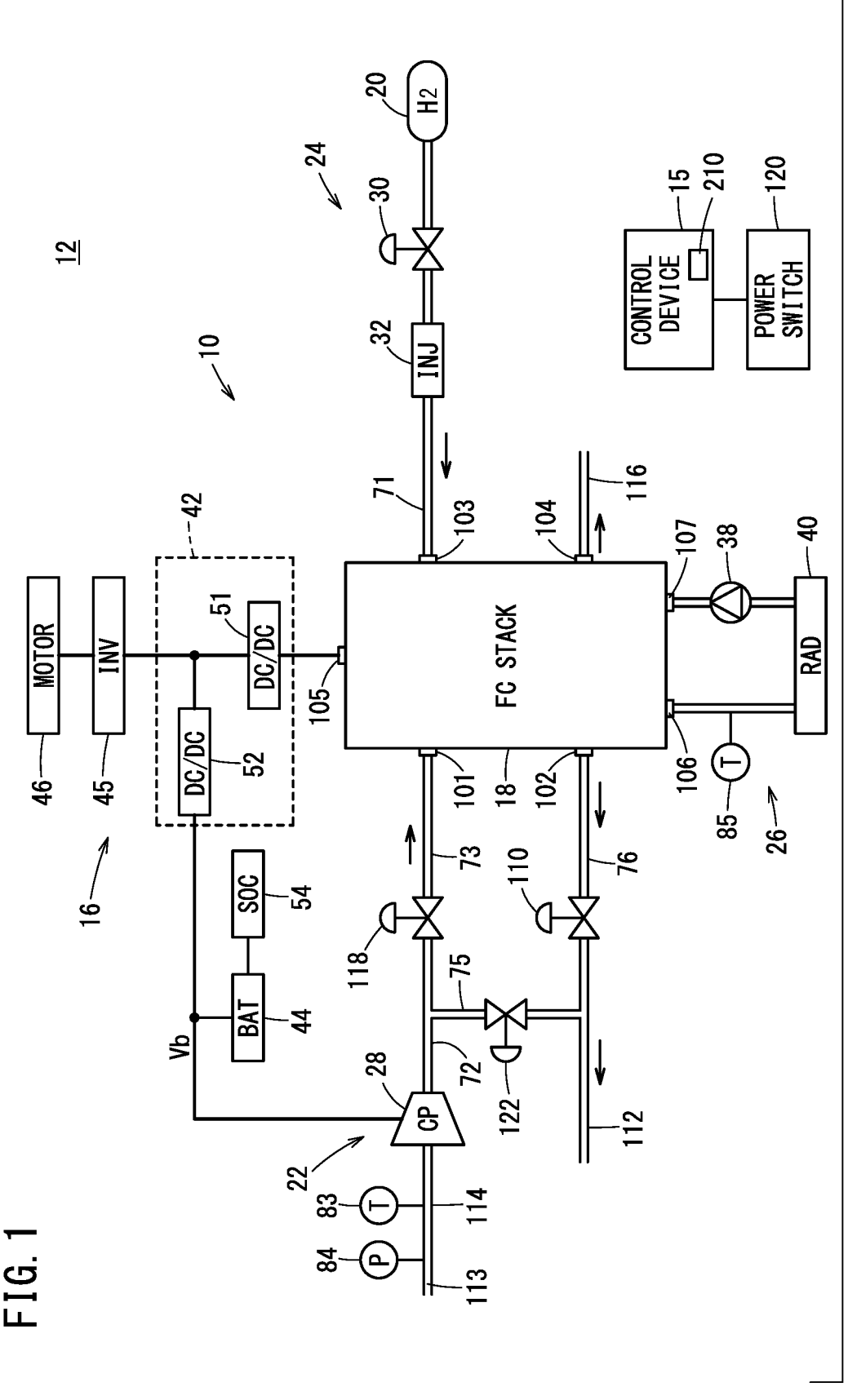
FIG. 1 is a structural diagram schematically showing a fuel cell vehicle including a fuel cell system according to an embodiment of the present invention.

FIG. 1 is a structural diagram schematically showing a fuel cell vehicle (FCV) 12 including a fuel cell system (FCS) 10 according to an embodiment of the present invention.

The fuel cell system 10 can be incorporated into other movable elements such as ships, airplanes, robots other than the fuel cell vehicle 12.

The fuel cell vehicle 12 includes a control device 15 for controlling the entire fuel cell vehicle 12, the fuel cell system 10, and an output unit 16 electrically connected to the fuel cell system 10. The control device 15 need not necessarily be just one control device. Two or more control devices, e.g., for the fuel cell system 10 and for the output unit 16 may be provided.

The output unit 16 includes a drive unit 42, an inverter 45, and a motor (electric motor) 46. The fuel cell vehicle 12 travels by the driving force generated by the motor 46.

The load of the drive unit 42 includes, in addition to the motor 46 as an electric main device, a compressor 28 as an electric auxiliary device. In addition to the compressor 28, the electric auxiliary device includes a coolant pump 38 described later, and an air conditioner (not shown), etc.

An energy storage device (BAT) 44 as a high voltage battery is incorporated between the drive unit 42 and the compressor 28. An SOC sensor 54 for measuring the SOC [%] of the energy storage device 44 is attached to the energy storage device 44.

The SOC sensor 54 detects the SOC of the energy storage device 44 {energy storage state [%]=(current remaining capacity)/(fully charged capacity amount)×100}, and calculates the current allowable electric discharge electric power Pbc [W] of the energy storage device 44, which is the maximum dischargeable power dependent on the SOC of the energy storage device 44.

The SOC sensor 54 calculates the SOC [%] which is the remaining capacity relative to the fully charged capacity, from the temperature, input/output current (charge/discharge current), and energy storage voltage Vb of the energy storage device 44. The SOC sensor 54 notifies the control device 15 of the current allowable discharge electric power Pbc according to the calculated SOC and temperature.

The allowable discharge electric power Pbc of the energy storage device 44 becomes large as the energy storage voltage Vb becomes large. The energy storage voltage Vb depends on the SOC of the energy storage device 44. Further, the allowable discharge electric power Pbc of the energy storage device 44 becomes large as the internal resistance of the energy storage device 44 becomes small. The allowable discharge electric power Pbc may be calculated by the control device 15 instead of by the SOC sensor 54.

The fuel cell system 10 is made up of a fuel cells stack (FC stack, also simply referred to as the fuel cell) 18, a fuel tank (hydrogen tank) 20, an oxygen-containing gas supply apparatus 22, a fuel gas supply apparatus 24, and a coolant supply apparatus 26.

The fuel cell stack 18 has an oxygen-containing gas inlet 101, an oxygen-containing off gas outlet 102, a fuel gas inlet 103, a fuel off gas outlet 104, an output electrode (positive/negative output electrode) 105, a coolant outlet 106, and a coolant inlet 107. The oxygen-containing gas supply apparatus 22 includes the compressor (CP) 28 as the electric auxiliary device.

The fuel gas supply apparatus 24 includes an injector 32. The injector 32 may be replaced with a depressurization valve.

A shutoff valve 30, the injector 32, and a fuel gas supply channel 71 are provided in this order from the fuel tank 20, between the fuel gas inlet 103 and the fuel tank 20.

An oxygen-containing gas discharge channel 72, a supply side stop valve 118 on the inlet side of the oxygen-containing gas, an oxygen-containing gas supply channel 73 are provided in this order from the compressor 28, between the oxygen-containing gas inlet 101 and an oxygen-containing gas discharge end of the compressor 28. An oxygen-containing off gas channel 76 is connected to the oxygen-containing off gas outlet 102.

The oxygen-containing off gas channel 76 is connected to a discharge channel 112 of the oxygen-containing off gas through a discharge side stop valve 110 which also functions as a back pressure valve.

The oxygen-containing gas discharge channel 72 is branched, and connected to the inlet side of a bypass channel 75 having a bypass valve 122. The outlet side of the bypass channel 75 is connected to the discharge channel 112.

A discharge channel 116 of a fuel off gas is connected to a fuel off gas outlet 104.

A radiator 40 and a coolant pump 38 are provided in this order from the coolant outlet 106, between the coolant outlet 106 and the coolant inlet 107.

The fuel cell stack 18 is a fuel cell stack of polymer electrolyte fuel cells (PEFC type). A plurality of power generation cells (not shown) are stacked together to form the fuel cell stack 18.

The fuel cell stack 18 generates electricity by electrochemical reactions of an oxygen-containing gas supplied from the oxygen-containing gas inlet 101 and a fuel gas supplied from the fuel gas inlet 103, and supplies the power generation electric power (direct current electric power) from the output electrode 105 to the drive unit 42.

The drive unit 42 includes a voltage boost converter 51 which is a step-up type DC-DC converter, and a voltage buck-boost converter 52 which is a step-up/down type DC-DC converter.

The voltage boost converter 51 steps up the power generation voltage of the electric power generated by the fuel cell stack 18, and supplies the stepped-up power generation voltage to the direct current (DC) end of the inverter 45, and supplies the power generation voltage stepped up by the voltage boost converter 51 to the boost end of the voltage buck-boost converter 52.

The inverter 45 converts the generated electric power supplied to the DC end into 3-phase AC electric power and supplies it to the motor 46 to generate a driving force in the motor 46. The fuel cell vehicle 12 travels by the driving force of the motor 46.

On the other hand, during deceleration of the fuel cell vehicle 12, the inverter 45 converts the 3-phase AC regenerative electric power generated by the motor 46 into DC electric power and supplies the DC electric power to the boost end of voltage buck-boost converter 52.

The voltage buck-boost converter 52 steps down each of the voltage of the regenerative electric power supplied to the boost end or the redundant electric power generated by the fuel cell stack 18 to charge the energy storage device 44.

During startup of the fuel cell system 10, the DC electric power of the energy storage device 44 is supplied to the compressor 28 and the drive unit 42 for operating the compressor 28 and the drive unit 42 (it should be noted that the electric power for operating the drive unit 42 is extremely small in comparison with the electric power for operating the compressor 28).

The oxygen-containing gas supplied to the fuel cell stack 18 for power generation is discharged as an oxygen-containing off gas from the oxygen-containing off gas outlet 102, and discharged to the outside through the oxygen-containing off gas channel 76, the discharge side stop valve 110, and the discharge channel 112.

The fuel gas supplied to the fuel cell stack 18 for power generation is discharged as a fuel off gas from the fuel off gas outlet 104, and mixed with the oxygen-containing gas through the discharge channel 116 and a diluter (not shown), and then, discharged to the outside.

The compressor 28 comprises a mechanical supercharger, etc., and is made up of a compressor synchronous motor (this is one example (not shown)) for driving the supercharger, and a compressor inverter (not shown) for driving the compressor synchronous motor. The energy storage voltage Vb as the DC voltage of the energy storage device 44 is applied to the DC end of the compressor inverter.

The rotation number of the compressor motor of the compressor 28 (rotation number of the compressor 28) N [rpm] and the rotation number acceleration rate A [rpm/sec] can be controlled by the control device 15, by controlling the inverter for the compressor 28.

The compressor 28 sucks and pressurizes the outside air (atmospheric air, the air) supplied from an outside air inlet 113, and supplies the pressurized air to the fuel cell stack 18 through the supply side stop valve 118, and the oxygen-containing gas supply channel 73 and the oxygen-containing gas inlet 101.

Further, the compressor 28 supplies the pressurized air to the discharge channel 112 through the bypass valve 122. The bypass valve 122 regulates the flow rate of the oxygen-containing gas bypassing the fuel cell stack 18.

A channel 114 connecting the outside air inlet 113 and the compressor 28 is provided with an intake air temperature acquisition unit 83 for detecting the outside air (air) as intake air temperature Ta, and an atmospheric air pressure acquisition unit 84 as a pressure sensor for detecting the atmospheric pressure Pa. The coolant outlet 106 is provided with a coolant temperature acquisition unit 85 as a temperature sensor for detecting the outlet temperature of the coolant.

Each of the components of the fuel cell system 10 is controlled by the control device 15 as a whole. A power switch 120 of the fuel cell vehicle 12 is connected to the control device 15.

When the power switch 120 is in the ON state, the power switch 120 starts or continues the power generation operation of the fuel cell stack 18 to place the fuel cell vehicle 12 in a travel ready state or the travel state, and when the power switch 120 is in the OFF state, the power switch 120 terminates the power generation of the fuel cell stack 18, and places the fuel cell vehicle 12 in a stop state.

In addition to the above described SOC sensor 54, the atmospheric air pressure acquisition unit 84, the intake air temperature acquisition unit 83, and an accelerator position sensor, a vehicle velocity sensor, etc. (not shown) are connected to the control device 15.

Based on the ON/OFF information of the power switch 120 and the physical quantities acquired by the various acquisition units and the various sensors described above, the control device 15 controls the drive unit 42 and opening/closing and the opening degrees, etc. of the various valves, and controls the electric auxiliary devices such as the compressor 28 and the coolant pump 38, and the motor 46 as the electric main device.

The control device 15 comprises an ECU (Electronic Control Unit). The ECU comprises a computer including at least one processor (CPU), a memory (storage device), an input/output interface, and an electronic circuit. The at least one processor (CPU) executes a computer executable command stored in the memory.

The memory stores various maps for controlling the fuel cell stack 18 and the fuel cell vehicle 12. FIG. 1 shows a map 210 for calculating the rotation number acceleration rate described late in a block of the control device 15.

The processor (CPU) of the control device 15 refers to the map 210, and performs computation according to the program based on the acquired physical quantities to control operation of the fuel cell vehicle 12 and the fuel cell system 10.

[Operation]

The fuel cell vehicle 12 having the fuel cell system 10 according to the embodiment basically has the structure as described above. Hereinafter, operation during startup of the fuel cell system 10 will be described with reference to FIGS. 2 and 3.

In step S1, the control device 15 detects whether the power switch 120 has been placed in the ON state. When the control device 15 determines that the power switch 120 has been placed in the ON state (step S1: YES), the control device 15 opens the bypass valve 122, and the process proceeds to step S2.

In the OFF state where the power switch 120 has not been placed in the ON state, all of the supply side stop valve 118, the discharge side stop valve 110, the bypass valve 122, and the shutoff valve 30 are closed.

In step S2, the control device 15 acquires the allowable discharge electric power Pbc [kW] of the energy storage device 44, which is detected by the SOC sensor 54, and the process proceeds to step S3.

In step S3, the control device 15 determines whether or not the obtained allowable discharge electric power Pbc exceeds the peak electric power (allowable peak electric power) Ppkr [pW], which is a value obtained by adding the overshoot amount at the steady state electric power Pr (steady state overshoot amount) OSr [kW] to the steady state electric power Pr when the compressor 28 is operated using a target setting of the steady state electric power Pr [kW], as shown in the inequality (1).

$$Pbc > Ppkr = (Pr + OSr) \qquad (1)$$

It should be noted that some amount of margin may be subtracted from the right side of the inequality (1). From the viewpoint of shortening the startup time, it is preferable to adopt a small margin. However, the margin is determined in a manner that the inequality (1) is satisfied even in the presence of noise, etc.

In this embodiment, the steady state electric power Pr of the compressor 28 is the rated power consumption of the compressor 28. At this rated power consumption, the compressor 28 can sustain rotation at the steady state rotation number Nr which is the rated rotation number (maximum continuous rotation number).

The compressor 28 can operate stably within a constant rotation number range which is lower than the steady state rotation number Nr, without any wobbling in the rotation number. At low steady state electric power Prlow in a certain range lower than the steady state electric power Pr (rated power consumption) at which the compressor 28 rotates at the steady state rotation number Nr, the compressor 28 stably keeps rotation at a rotation number Nrlow (hereinafter referred to as the low steady state rotation number) which is lower than the steady state rotation number Nr.

For example, the target settings of the low steady state electric power Prlow of the compressor 28 and the low steady state rotation number Nrlow which can be sustained by consuming the low steady state electric power Prlow are lower limit values at which the compressor 28 can operate normally.

Figure 4:
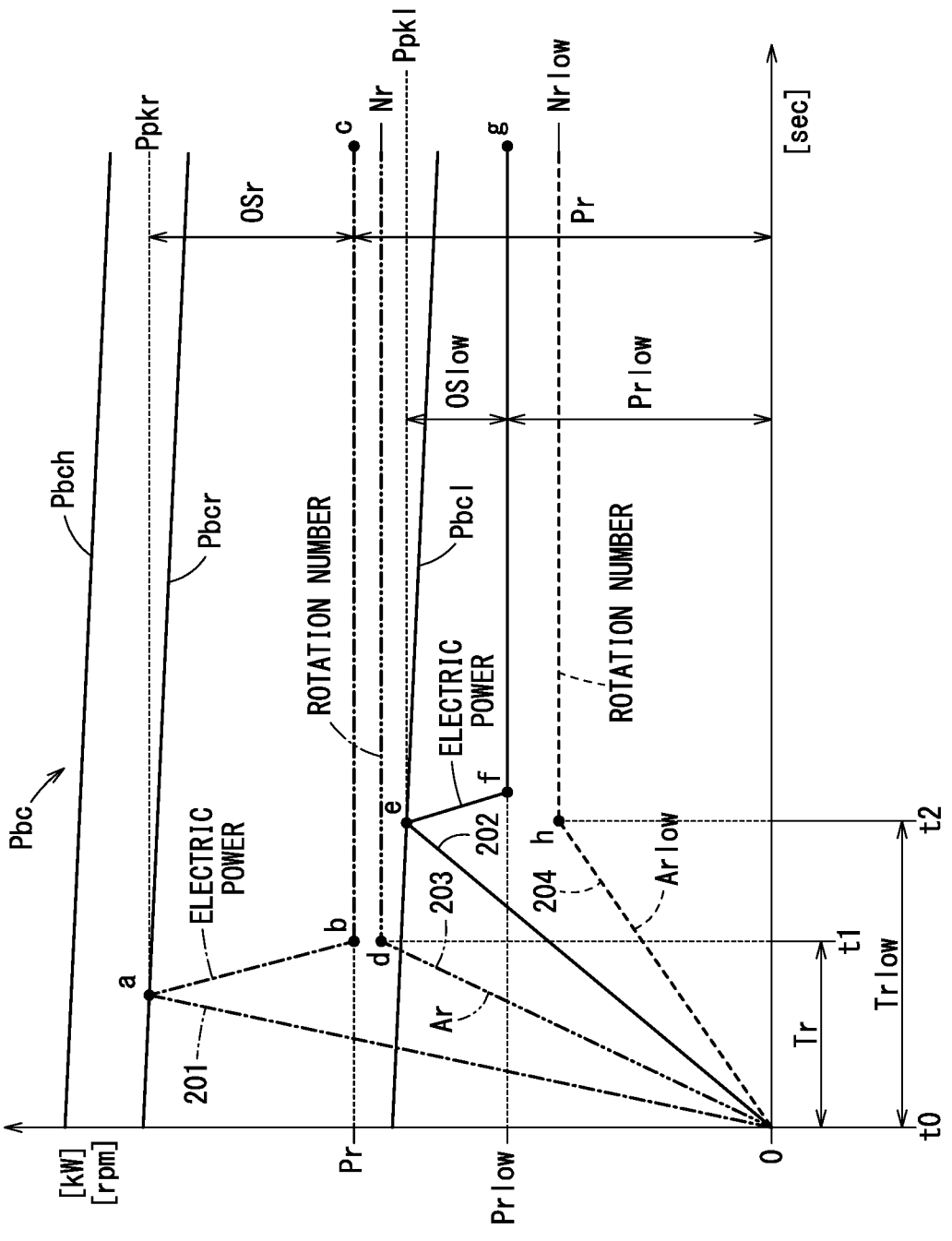
FIG. 4 is a timing chart showing a transient response waveform during startup of a compressor as an electric auxiliary device.

FIG. 4 is a timing chart showing an example of a map of response waveforms (transient response waveforms) during startup of the compressor 28. In the timing chart, the horizontal axis indicates the time, and the vertical axis indicates the power consumption [kW] or the rotation number [rpm] of the compressor 28. The response waveform map (also referred to as the transient response map) is recorded in the memory unit of the control device beforehand.

During the startup, the compressor 28 is driven by feed forward control until the rotation number reaches a target rotation number (the steady state rotation number Nr or the low steady state rotation number Nrlow).

A transient response (transient response map) 201 of the power consumption of the compressor 28 along point 0→point a→point b→point c, denoted by a one dot chain line in FIG. 4, shows the response waveform in the case where the compressor 28 uses the target setting of the steady state electric power Pr [kW]. In this case, the allowable discharge electric power Pbc [kW] of the energy storage device 44 exceeds the above peak electric power Ppkr (power consumption of the compressor 28 at point a), where Pbc=Pbch (allowable discharge electric power Pbch>Ppkr in FIG. 4).

In the case where Pbc=Pbch>Ppkr, an overshoot amount OSr having a large amplitude is allowable. Therefore, if the target setting of the steady state electric power Pr [kW] is used, the startup time Tr from the startup time t0 of the compressor 28 to the stable steady state rotation number Nr (constant rotation number after time t1 corresponding to point d) is the shortest startup time of Tr=(t1−t0).

In practice, the allowable discharge electric power Pbc decreases over time from time t0 in accordance with the decrease of SOC, as shown by respective rightward declining straight lines of the allowable discharge electric power Pbch, the allowable discharge electric power Pbcr (which becomes equal to the peak electric power Ppkr at point a) and the allowable discharge electric power Pbcl (which becomes equal to the peak electric power Ppkl at point e) in FIG. 4. This is because, during the startup where the fuel cell stack 18 is not performing power generation, charging of the energy storage device 44 using the power generation electric power Pfc cannot be performed.

If the determination in step S3 is positive (step S3: YES) (allowable discharge electric power Pbc>peak electric power Ppkr), the process proceeds to step S4. If the determination in step S3 is negative (step S3: NO) (allowable discharge electric power Pbc≤peak electric power Ppkr), the process proceeds to step S5.

In step S4, the control device 15 determines to start the compressor 28 using the target setting of steady state electric power Pr (steady state electric power startup), and the process proceeds to step S6. In this case, the overshoot amount OSr using the steady state electric power Pr of the compressor 28 is allowable by the electric power which is not less than the allowable discharge electric power Pbcr of the energy storage device 44.

In step S5, the control device 15 determines to perform startup operation of the compressor 28 using the target setting of low steady state electric power Prlow, which is lower than steady state electric power Pr (low steady state electric power startup), and the process proceeds to step S6.

That is, the overshoot amount OSr using the steady state electric power Pr of the compressor 28 is not allowable for the allowable discharge electric power Pbcl of the energy storage device 44. Therefore, the overshoot amount OS must be changed to the overshoot amount OSlow. Therefore, the control device 15 determines to perform the startup operation using the low steady state electric power Prlow which exhibits a transient response (transient response map) 202 denoted by a solid line lower than the steady state electric power Pr where Oslow=Ppkl (peak electric power as allowable peak electric power)−Prlow (low steady state electric power).

The transient response of power consumption of the compressor 28 along point 0→point e→point f→point g (transient response map) 202, denoted by a solid line in FIG.

4, shows the response waveform of the compressor 28 using the target setting of low steady state electric power Prlow [kW].

In practice, under the steady state electric power Pr (rated power consumption herein) and the low steady state electric power Prlow, the steady state rotation number Nr, and the low steady state rotation number Nrlow need to be modified by changes of the air density. Under standard conditions, e.g., under the intake air temperature Ta=25 [° C.] (room temperature) and the atmospheric pressure Pa=1013 [hPa] (normal pressure), the steady state rotation number Nr varies in proportion to the intake air temperature Ta and varies negatively in proportion to the pressure Pa from the equation of state of the ideal gas.

Then, in step S6, the control device 15 obtains the atmospheric pressure Pa and intake air temperature Ta through the atmospheric air pressure acquisition unit 84 and the intake air temperature acquisition unit 83, and the process proceeds to step S7 or step S7'.

In the following description, steps S7 to S12 correspond to the startup process (step S4) using the target setting of the steady state electric power Pr of the compressor 28, and steps S7' to S12' correspond to the startup process (step S5) using the target setting of the low steady state electric power Prlow of the compressor 28. Hereinafter, for the purpose of brevity, explanations are provided in a parallel manner.

In step S7, the control device 15 modifies the steady state rotation number Nr [rpm] which is a rotation number command value in the steady state electric power startup determined in step S4 according to the atmospheric pressure Pa and the intake air temperature Ta to calculate the modified steady state rotation number Nr, and the process proceeds to step S8. In step S7', the control device 15 modifies the low steady state rotation number Nrlow which is a rotation number command value in the low steady state electric power startup determined in step S5 according to the atmospheric pressure Pa and the intake air temperature Ta to calculate the modified low steady state rotation number Nrlow, and the process proceeds to step S8'.

In step S8, the control device 15 modifies the steady state electric power Pr in the steady state electric power startup determined in step S4 according to the atmospheric pressure Pa and the intake air temperature Ta to calculate the modified steady state electric power Pr, and the process proceeds to step S9. In step S8', the control device 15 modifies the low steady state electric power Prlow in the low steady state electric power startup determined in step S5 according to the atmospheric pressure Pa and the intake air temperature Ta to calculate the modified low steady state electric power Prlow, and the process proceeds to step S9'.

In step S9, the control device 15 calculates the overshoot amount (allowable overshoot amount) OSr by subtracting the modified steady state electric power Pr from the allowable discharge electric power Pbcr (peak electric power Ppkr) of the energy storage device 44, as shown in an equation (2), and the process proceeds to step S10 in FIG. 3.

$$OSr=Pbcr(Ppkr)-Pr \qquad (2)$$

In step S9', the control device 15 calculates the overshoot amount (allowable overshoot amount) OSlow by subtracting the modified low steady state electric power Prlow from the allowable discharge electric power Pbcl (peak electric power Ppkl) of the energy storage device 44 as shown in an equation (3), and the process proceeds to step S10'.

$$OSlow=Pbcl(Ppkl)-Prlow \qquad (3)$$

Figure 5:
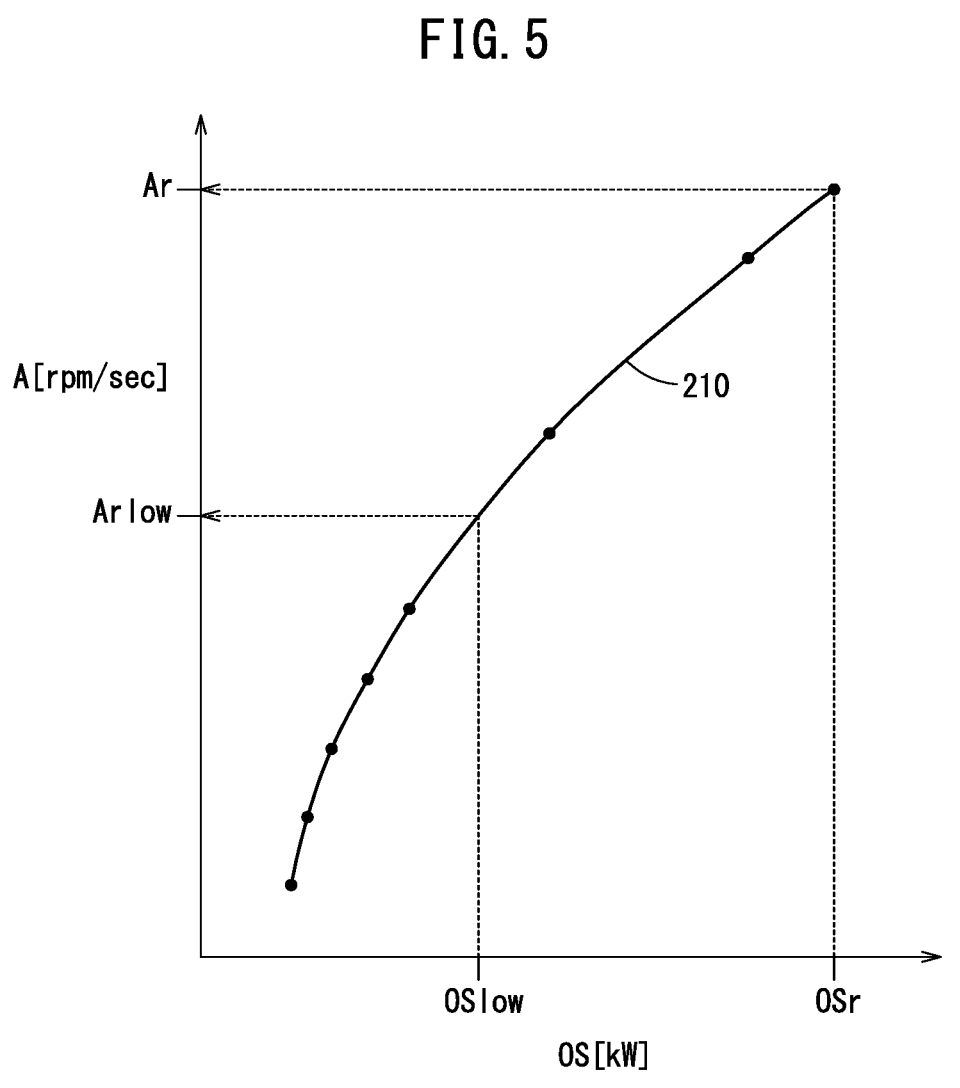

FIG. 5 shows a map 210 for calculating the rotation number acceleration rate A [rpm/sec] recorded in the memory unit of the control device 15. The horizontal axis indicates the overshoot amount OS [kW] and the vertical axis indicates the rotation number acceleration rate A [rpm/sec].

It can be understood that the following is acceptable. That is, the larger the overshoot amount OS [kW] becomes, the larger the rotation number acceleration rate A [rpm/sec] may become. In other words, the overshoot amount OS of the compressor 28 is substantially in proportion to the rotation number acceleration rate A.

In step S10, the control device 15 calculates the steady state rotation number acceleration rate Ar according to the allowable overshoot amount OSr with reference to the map 210, and the process proceeds to step S11.

In step S10', the control device 15 calculates the low steady state rotation number acceleration rate Arlow according to the allowable overshoot amount OSlow, and the process proceeds to step S11'.

In FIG. 4, the steady state rotation number acceleration rate Ar corresponds to the slope from the rotation number 0 to the steady state rotation number Nr between time t0 and time t1, and the low steady state rotation number acceleration rate Arlow corresponds to the slope from the rotation number 0 to the low steady state rotation number Nrlow between time t0 and time t2.

In step S11, the control device 15 performs feed forward control of the compressor 28 to increase the rotation number N from the rotation number N=0 to the steady state rotation number Nr while maintaining the steady state rotation number acceleration rate Ar of the compressor 28, and the process proceeds to step S12.

In step S11', the control device 15 performs feed forward control of the compressor 28 to increase the rotation number N from the rotation number N=0 to the low steady state rotation number Nrlow while maintaining the low steady state rotation number acceleration rate Arlow of the compressor 28, and the process proceeds to step S12'.

In step S12, the control device 15 determines whether or not the rotation number N of the compressor 28 has reached the steady state rotation number Nr, and repeats the process from step S12: NO→step S11 until the rotation number N reaches the steady state rotation number Nr, and when the rotation number N of the compressor 28 reaches the steady state rotation number Nr (at time t1 in FIG. 4), the process proceeds to step S13. In this case, in comparison with the case of using the startup technique without any overshoot (overshoot amount OS=0), since the overshoot amount OSr is allowed, it is possible to shorten the startup time Tr (t1−t0) of the compressor 28.

In step S12', the control device 15 determines whether or not the rotation number N of the compressor 28 has reached the low steady state rotation number Nrlow, and repeats the process of step S12': NO→step S11' until the rotation number N reaches the low steady state rotation number Nrlow, and when the rotation number N reaches the low steady state rotation number Nrlow (at time t2 in FIG. 4), the process proceeds to step S13. In this case, in comparison with the case of using the startup technique without any overshoot (overshoot amount OS=0), since the overshoot amount OSlow is allowed, it is possible to shorten the startup time Trlow (t2−t0) of the compressor 28.

Since the bypass valve 122 is opened when the power switch 120 is turned on in step S1, at the time of performing the rotation number acceleration rate control process during the startup of the fuel cell system 10 in steps S11 and S12

(step S11' and S12'), it is possible to dilute the fuel off gas remaining in the fuel cell system 10 by the oxygen-containing gas supplied from the compressor 28 to the discharge channel 112 of the oxygen-containing off gas through the bypass valve 122, and discharge the diluted fuel off gas to the outside air.

The control to increase the rotation umber N of the compressor 28 can be performed by duty control of the inverter for the compressor 28, for example.

When the positive determination result of step S12: YES (step S12': YES) is obtained, the startup process of the compressor 28 is completed (at time t1 or time t2).

In step S13, the control device 15 changes the supply side stop valve 118 and the discharge side stop valve 110 from the closed state to the open state, and places the bypass valve 122 into the closed state, and the process proceeds to step S14.

In step S14, according to the required power generation electric power of the fuel cell vehicle 12, the control device 15 determines the target flow rate of the oxygen-containing gas to be supplied to the fuel cell stack 18, and performs feedback control (F/B control) of the rotation number N of the compressor 28 to reach the target flow rate of the oxygen-containing gas. Further, the control device 15 determines the target flow rate of the fuel gas supplied to the fuel cell stack 18, and performs feedback control (F/B control) of the duty of the injector 32 to reach the target flow rate of the fuel gas.

As described above, in the above embodiment, during the startup after the power switch 120 is turned on, in correspondence with the allowable discharge electric power Pbc (Pbch, Pbcr, Pbcl) of the energy storage device 44 notified from the SOC sensor 54, the control device 15 performs the following steps.

(i) The control device 15 determines whether the startup is the startup using the target setting of the steady state electric power Pr or the startup using the target setting of the low steady state electric power Prlow where the steady state electric power Pr is suppressed.

(ii) In the case of the startup using the target setting of the steady state electric power Pr, the control device 15 switches to the process of calculating the steady state rotation number Nr, and in the case of the startup using the target setting of the low steady state electric power Prlow, the control device 15 switches to the process of calculating the low steady state rotation number Nrlow.

(iii) Based on the atmospheric pressure Pa and the intake air temperature Ta, the control device 15 modifies the steady state rotation number Nr, the low steady state rotation number Nrlow, the steady state electric power Pr and low steady state electric power Prlow under standard conditions.

(iv) The control device 15 calculates the allowable overshoot amount Osr by subtracting the modified steady state electric power Pr from the allowable discharge electric power Pbcr (peak electric power Ppkr), and calculates the steady state rotation number acceleration rate Ar corresponding to the calculated allowable overshoot amount OSr with reference to the map 210. Otherwise, the control device 15 calculates the allowable overshoot amount Oslow by subtracting the modified low steady state electric power Prlow from the allowable discharge electric power Pbcl (peak electric power Ppkl), and calculates the low steady state rotation number acceleration rate Arlow corresponding to the calculated allowable overshoot amount Oslow with reference to the map 210.

(v) The control device 15 performs startup control to reach the modified steady state rotation number Nr while keeping the steady state rotation acceleration rate Ar by the feed forward control. Otherwise, the control device 15 performs startup control to reach the modified low steady state rotation number Nrlow while maintaining the low steady state rotation number acceleration rate Arlow by the feed forward control.

(vi) After the startup operation is finished, the control device 15 starts power generation control of the fuel cell stack 18 at the rotation number N of the compressor 28 by the feedback control.

That is, feed forward control (startup control) is performed to increase the rotation number to the modified steady state rotation number Nr while maintaining a steady state rotation acceleration rate Ar. In this manner, the overshoot amount OS is suppressed to the allowable overshoot amount OSr. Otherwise, feed forward control (startup control) is performed to increase the rotation number to a modified low steady state rotation number Nrlow while maintaining a low steady state rotation acceleration rate Arlow. In this manner, the overshoot amount OS is suppressed to an allowable overshoot amount OSlow. By the control in the manner as described above, it is possible to avoid excessive electric discharge (overload) of the energy storage device 44 and prevent the startup time of the compressor 28 as the electric auxiliary device from becoming unnecessarily long, and shorten the startup time of the fuel cell system 10. Consequently, the technique contributes to energy efficiency.

Invention Understood from the Embodiments

Hereinafter, the invention understood from the above embodiments will be described. For ease of understanding, some of constituent elements are labelled with reference numerals used in the above embodiments. However, the present invention is not limited to the particular labelled constituent elements.

(1) The fuel cell system 10 according to the present invention includes the fuel cell stack 18 configured to perform power generation using a fuel gas and an oxygen-containing gas, the electric auxiliary device used for power generation operation of the fuel cell stack, the energy storage device 44 configured to supply electric power to the electric auxiliary device, and the control device 15 configured to control operation of the electric auxiliary device. The control device is configured to, at the time of driving the electric auxiliary device by feed forward control during startup, determine whether an allowable discharge electric power Pbc of the energy storage device is not less than or less than peak electric power Ppkr generated using a target setting of a steady state electric power Pr of the electric auxiliary device. If the allowable discharge electric power of the energy storage device is not less than the peak electric power, the control device drives the electric auxiliary device using the target setting of the steady state operation rate to reach the steady state electric power. If the allowable discharge electric power of the energy storage device is less than the peak electric power, the control device drives the electric auxiliary device using the target setting of a low steady state operation rate to reach low steady state electric power Prlow where the steady state electric power of the electric auxiliary device is decreased, so as to decrease peak electric power to the allowable peak electric power Ppkl which is less than the allowable discharge electric power.

In the present invention, during the startup of the fuel cell system, if it is determined that the peak electric power generated using the steady state electric power is not less than the allowable discharge electric power of the energy storage device, the electric auxiliary device is driven using the low steady state electric power where the steady state electric power of the electric auxiliary device is decreased, and using the setting of the low steady state operation rate where the steady state operation rate is decreased so as to decrease peak electric power of the electric auxiliary device generated during the startup to be less than the allowable discharge electric power.

In this manner, it is possible to avoid excessive electric discharge (overload) of the energy storage device and prevent the startup time from becoming unnecessarily long, and shorten the startup time of the fuel cell system. Consequently, the technique contributes to energy efficiency.

(2) Further, in the fuel cell system, the electric auxiliary device is the compressor 28 configured to compress an air taken from the atmospheric air and supply the compressed air to the fuel cell stack as the oxygen-containing gas. The steady state operation rate is a steady state rotation number acceleration rate Ar of the compressor, and the low steady state operation rate is set to a low steady state rotation number acceleration rate Arlow which is lower than the steady state rotation number acceleration rate.

In this manner, it is possible to set the suitable rotation number acceleration rate of the compressor. Further, it is possible to avoid excessive electric discharge (overload) of the energy storage device and prevent the startup time of the compressor from becoming unnecessarily long.

(3) Further, in the fuel cell system, the control device is configured to calculate the steady state overshoot amount OSr by subtracting the steady state electric power from the peak electric power, or calculate the low steady state overshoot amount OSlow by subtracting the low steady state electric power from the allowable peak electric power, and calculate the steady state rotation number acceleration rate and the low steady state rotation number acceleration rate with reference to the map 210 of the rotation number acceleration rate relative to the previously recorded overshoot.

In this manner, it is possible to calculate the steady state rotation number acceleration rate or the low steady state rotation number acceleration rate from the overshoot amount easily.

(4) Moreover, preferably, the fuel cell system further includes the intake air temperature acquisition unit 83 configured to obtain the temperature of the air as an intake air temperature Ta, and the atmospheric air pressure acquisition unit 84 configured to obtain the atmospheric pressure Pa, and the control device is configured to modify the steady state electric power, the low steady state electric power, the steady state rotation number acceleration rate, and the low steady state rotation number acceleration rate, in accordance with the intake air temperature and the atmospheric pressure.

In this manner, based on the atmospheric pressure and the temperature of the air (intake air temperature), it is possible to modify the steady state electric power, the low steady state electric power, the steady state rotation number acceleration rate, and the low steady state rotation number acceleration rate.

(5) Moreover, in the fuel cell system, during the startup, when power consumption of the compressor is increased from a value of zero to peak electric power, and then decreased to the steady state electric power which has been set as the target setting or the low steady state electric power, the control device is configured to finish the startup by the feed forward control, and subsequently, supply the oxygen-containing gas to the fuel cell stack to start power generation, and perform feedback control of the power consumption and the rotation number of the compressor in a manner that the power generation electric power of the fuel cell stack becomes required power generation electric power.

In this manner, since it is possible to shorten the startup time of the compressor until the time of starting power generation, it is possible to shorten the time from tuning on the power switch to the normal power generation control state of the fuel cell stack (power generation state where feedback control of the power consumption and the rotation number of the compressor is performed in a manner that the power generation electric power of the fuel cell stack becomes equal to the required power generation electric power of the load).

The present invention is not limited to the above disclosure, and various modifications are possible without departing from the essence and gist of the present invention.

The invention claimed is:

1. A fuel cell system comprising:

a fuel cell stack configured to perform power generation using a fuel gas and an oxygen-containing gas;

an electric auxiliary device configured to provide the oxygen-containing gas for power generation operation of the fuel cell stack;

an energy storage device configured to supply electric power to the electric auxiliary device; and a control device comprising one or more processors configured to execute computer-executable instructions stored in a memory, wherein the one or more processors are configured to execute the computer-executable instructions to cause the fuel cell system to:

at the time of driving the electric auxiliary device by feed forward control during startup, determine whether an allowable discharge electric power of the energy storage device is not less than or less than a peak electric power generated using a target setting of a steady state electric power of the electric auxiliary device;

if the allowable discharge electric power of the energy storage device is not less than the peak electric power, drive the electric auxiliary device using a target setting of a steady state operation rate to reach the steady state electric power; and if the allowable discharge electric power of the energy storage device is less than the peak electric power, drive the electric auxiliary device using a target setting of a low steady state operation rate to reach a low steady state electric power where the steady state electric power of the electric auxiliary device is decreased, so as to decrease the peak electric power to an allowable peak electric power which is less than the allowable discharge electric power.

2. The fuel cell system according to claim 1, wherein the electric auxiliary device is a compressor configured to compress an air taken from atmospheric air and supply the compressed air to the fuel cell stack as the oxygen-containing gas;

the steady state operation rate is a steady state rotation number acceleration rate of the compressor; and the low steady state operation rate is set to a low steady state rotation number acceleration rate which is lower than the steady state rotation number acceleration rate.

3. The fuel cell system according to claim 2, wherein the control device is configured to calculate a steady state overshoot amount by subtracting the steady state electric power from the peak electric power, or calculate a low steady state overshoot amount by subtracting the low steady state electric power from the allowable peak electric power; and calculate the steady state rotation number acceleration rate and the low steady state rotation number acceleration rate with reference to a map of the rotation number acceleration rate relative to a previously recorded overshoot amount.

4. The fuel cell system according to claim 2, wherein the control device is configured to obtain a temperature of the air as an intake air temperature;

obtain an atmospheric pressure; and modify the steady state electric power, the low steady state electric power, the steady state rotation number acceleration rate, and the low steady state rotation number acceleration rate, in accordance with the intake air temperature and the atmospheric pressure.

5. The fuel cell system according to claim 3, wherein the control device is configured to obtain a temperature of the air as an intake air temperature;

obtain an atmospheric pressure; and modify the steady state electric power, the low steady state electric power, the steady state rotation number acceleration rate, and the low steady state rotation number acceleration rate, in accordance with the intake air temperature and the atmospheric pressure.

6. The fuel cell system according to claim 2, wherein the control device is configured to, during the startup, when a power consumption of the compressor is increased from a value of zero to peak electric power, and then decreased to the steady state electric power which has been set as the target setting or a low steady state electric power, finish the startup by the feed forward control, and subsequently, supply the oxygen-containing gas to the fuel cell stack to start power generation, and performs feedback control of the power consumption and the rotation number of the compressor in a manner that the power generation electric power of the fuel cell stack becomes required power generation electric power.

7. The fuel cell system according to claim 3, wherein the control device is configured to, during the startup, when a power consumption of the compressor is increased from a value of zero to peak electric power, and then decreased to the steady state electric power which has been set as the target setting or a low steady state electric power, finish the startup by the feed forward control, and subsequently, supply the oxygen-containing gas to the fuel cell stack to start power generation, and performs feedback control of the power consumption and the rotation number of the compressor in a manner that the power generation electric power of the fuel cell stack becomes required power generation electric power.

* * * * *